United States Patent [19]

Murray

[11] Patent Number: 4,505,776
[45] Date of Patent: Mar. 19, 1985

[54] COMPOSITION AND METHOD FOR TREATING FLUE GAS AND METHANOL CONTAINING EFFLUENTS

[75] Inventor: Francis E. Murray, Richmond, Canada

[73] Assignee: Wescam Services Inc., Vancouver, Canada

[21] Appl. No.: 396,442

[22] Filed: Jul. 8, 1982

[51] Int. Cl.³ .................... C01B 17/64; D21C 11/08
[52] U.S. Cl. .................. 162/51; 162/30.11;
252/191; 252/192; 423/220; 423/225; 423/234;
423/514; 423/DIG. 3
[58] Field of Search ........... 423/220, 225, 234, 514,
423/DIG. 3; 252/191, 192; 162/30.11, 51

[56] References Cited

U.S. PATENT DOCUMENTS

| | | | |
|---|---|---|---|
| 1,792,097 | 2/1931 | Jacobson | 423/234 |
| 1,812,099 | 6/1931 | Kohr | 423/234 |
| 1,815,933 | 7/1931 | Sperr | 423/234 |
| 3,446,573 | 5/1969 | Richter | 423/225 |
| 3,554,859 | 1/1971 | Murray | |
| 3,701,824 | 10/1972 | Prabacs et al. | |
| 3,752,875 | 8/1973 | O'Hern | 423/225 |
| 3,794,711 | 2/1974 | Bhatia et al. | |
| 3,944,402 | 3/1976 | Cheremisinoff | 55/92 |
| 4,049,399 | 9/1977 | Teller | 423/225 |
| 4,067,768 | 1/1978 | Mackie | 162/79 |
| 4,299,652 | 11/1981 | Masuno | 423/221 |

FOREIGN PATENT DOCUMENTS 51-47101  4/1976  Japan ..................... 162/51

OTHER PUBLICATIONS

"Air Stripping Kraft Foul Condensates to Remove Methanol", *Pulp & Paper Canada*, vol. 80, No. 9, Sep. 1979, Blackwell et al.

Particle Conditioning by Steam Condensation, *AIChE Symposium Series*, vol. 71, No. 147, about 1976 or 1977, C. B. Prakash and F. E. Murray.

"Recovery Boilers–Emission Control with Product and Energy Recovery"; Pulp and Paper Canada, vol. 81, No. 12, Dec. 1980.

*Primary Examiner*—John Doll
*Assistant Examiner*—Jeffrey E. Russel
*Attorney, Agent, or Firm*—Townsend and Townsend

[57] ABSTRACT

A composition is provided which comprises an aqueous alkaline solution of a metal salt and black liquor, the metal salt being selected from the group consisting of iron, chromium, cobalt and nickel salts. This composition is useful in a process described for absorption of hydrogen sulfide from flue gas, followed by subsequent oxidation of dissolved sulfide to thiosulfate, if desired. The presence of the metal ions and black liquor synergistically catalyzes the overall reaction of absorption of hydrogen sulfide, followed by oxidation of the sulfide. Preferably, prior to scrubbing to remove hydrogen sulfide with the solution, the flue gas is first cooled to near its dew point, and then scrubbed with water to remove particulates. Additionally, the effluent flue gas from the absorption step is usefully scrubbed with water to recover heat, following which it is used to scrub condensates from a kraft pulp mill. The metal salt in the solution is preferably an iron salt at a concentration of about 0.002 M., the black liquor concentration being preferably about 1% to 5% by volume of the solution, and the pH being usefully about 9.0 to 9.5.

31 Claims, 1 Drawing Figure

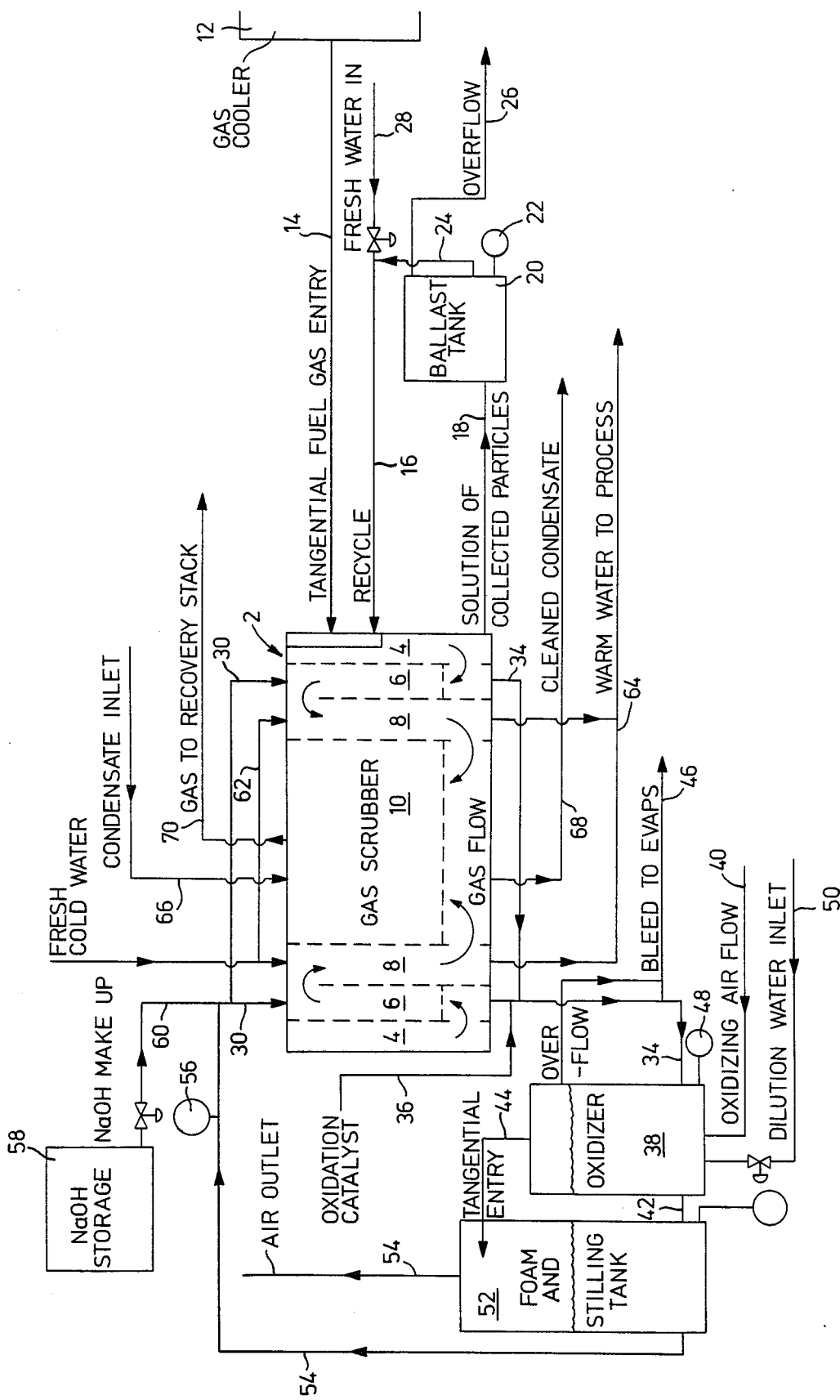

1

COMPOSITION AND METHOD FOR TREATING FLUE GAS AND METHANOL CONTAINING EFFLUENTS

FIELD OF THE INVENTION

This invention relates to a composition and method particularly useful for treating effluents from a kraft pulp mill, namely flue gas and effluent condensates.

DESCRIPTION OF PRIOR ART

In a kraft pulp mill, two particularly undesirable effluents are the flue gas, and condensates produced primarily in the multiple-effect evaporators. The flue gas contains particulates and sulfides, primarily in the form of hydrogen sulphide, and some sulfur dioxide all of which are undesirble air contaminants. In addition, the particulates consist to a substantial extent of chemicals such as sodium sulfide, which can be usefully returned to the chemical inventory of the pulp mill. The condensates contain a substantial proportion of methanol which has a high biological oxygen demand, making it undesirable to discharge such condensates directly into streams or rivers.

It is well known that hydrogen sulfide and sulphur dioxide can be removed from flue gas by scrubbing the gas with an alkaline solution. Sulfides (which word is used throughout this application to include hydro-sulfides) may then be oxidized by oxygen to sulfites and sulfates. Such an oxidation step is disclosed in U.S. Pat. No. 3,752,875 to O'Hern et al. In the oxidation process disclosed in that patent, insoluble smelt solids from the recovery furnace of a kraft or sulfite pulping mill are used as catalysts to promote the oxidation. Nickel, cobalt and iron may also be employed as catalysts in conjunction with the smelt solids. Although a fairly good catalytic effect was observed under the conditions utilized (which usually included fairly highpressure oxygen feed), such insoluble solids must first be separated from solid output from a recovery furnace. In addition, in a typical kraft mill it will also be desirable to recirculate the alkaline solution used for hydrogen sulfide absorption. In such a case, steps would have to be taken to ensure that the relatively small particles of smelt solids will not be recirculated into a usually packed hydrogen sulfide absorption tower, thereby resulting in fouling of the packing. Of course, O'Hern does not disclose any method for increasing absorption of hydrogen sulfide in the absorption tower.

It is also known that the presence of metal salts such as nickel salts, in small amounts in the alkaline scrubbing solution, will also catalyze oxidation of dissolved sulfide to sulphur. However, the increase in rate of oxidation is relatively small. Another known method for removing hydrogen sulfide from flue gas and oxidizing the sulfide to sulphur, consists in absorption of the hydrogen sulfide in an alkaline aqueous suspension of ferric hydroxide. However, the predominant end product again is sulphur and the suspension of ferric hydroxide tends to foul a packed hydrogen sulfide scubbing column.

With regard to the methanol containing condensates, these have typically been dumped directly into a sewer line, and hence in many cases find their way into rivers or streams. With regard to removal of particulates from flue gas from a kraft pulp mill, a great variety of methods have been proposed and used in the past, which are well known. It would be desirable though, to have an overall efficient process which efficiently removes particulates and hydrogen sulfide from such flue gas, and which also removes methanol from the condensates prior to their dumping.

SUMMARY OF THE INVENTION

A composition is provided which comprises an aqueous alkaline solution of a metal salt and black liquor. The metal salt is selected from the group consisting of iron, chromium, cobalt and nickel salts. The amount of metal salt and black liquor in solution is sufficient to synergistically increase absorption of hydrogen sulfide by the solution, with the black liquor concentration being 1 to 10% by volume.

Preferably, the amount of metal salt and black liquor is sufficient to synergistically catalyze the overall reaction of absorption of hydrogen sulfide by the solution, followed by oxidation of sulfide in the solution by oxygen, to thiosulfate. The pH off the solution is preferably between about 9.0 to 9.5, the iron concentration about 0.002 M., and the black liquor concentration between about 1 to 5% by volume.

A method of purifying flue gas is also provided, which comprises scrubbing the flue gas with an aqueous alkaline solution of metal salt and black liquor to absorb hydrogen sulfide. The metal salt is again selected from the group consisting of iron, chromium, cobalt and nickel salts. The amount of metal salts and black liquor in the solution is sufficient to synergistically increase absorption of hydrogen sulfide by the solution. Preferably, the metal salt is a salt of iron and the pH, iron concentration, and black liquor concentration are as previously described.

A method of oxidizing sulfide in an alkaline solution is also provided which comprises exposing the solution to oxygen in the presence of black liquor dissolved in a solution. The black liquor concentration is between about 1% to 10% by volume, and the temperature is maintained at about between 100° to 200° Farenheit. Usefully, a metal salt is also provided which metal salt is selected from the group consisting of iron, chromium, cobalt and nickel salts. In such a case, the amount of black liquor and metal salt is sufficient to synergistically increase the rate of oxidation of sulfide.

In the preceding oxidation method, the metal salt is preferably a salt of iron. Usefully, the pH of the alkaline solution is about 9.0 to 9.5, the concentration of iron therein is substantially 0.002 M., and the concentration of black liquor is about 4% to 5% by volume.

A method of purifying flue gas is provided which utilizes the same scrubbing step as previously described to absorb hydrogen sulfide. This method additionally comprises the step of oxidizing sulfide in the effluent solution from the hydrogen sulfide absorption step to thiosulfate. In this method, the amount of metal salt and black liquor is sufficient to synergistically catalyze the overall reaction of absorption of hydrogen sulfide and oxidation of sulfide using oxygen. The solution utilized by this method is usefully the composition previously described. Of the possible methods of scrubbing the flue gases with the alkaline solution, the preferred is a countercurrent method.

A method of purifying flue gas and condensates from a kraft pulp mill is also provided. This method comprises scrubbing the flue gases with the composition previously described, to absorb hydrogen sulfide. The flue gases are also scrubbed with water to recover heat from them. Then, the condensates are scrubbed with the flue gas. The scrubbing of the flue gas to recover heat is usefully maintained until the temperature of the gas is between 130° to 160° Farenheit.

In a second aspect of the method of purifying flue gas and condensates from a kraft pulp mill, the flue gas is first cooled to near its dew point. The cooled flue gas from the preceding step is then scrubbed with water to remove particulates. The effluent gas from this step is then scrubbed with an aqueous alkaline solution in the manner previously described. The condensates are then scrubbed with the effluent gas from the immediately preceding step.

In a third aspect of the method for purifying flue gas and condensates from a kraft pulp mill, the flue gas is first scrubbed with water to remove particulates, then scrubbed with an alkaline solution as described previously, then scrubbed with water to recover heat, then used to scrub the condensates. Preferably, the step of scrubbing to recover heat is maintained until the temperature of the gas is between 130° to 160° Farenheit.

Usefully, the third aspect of the method as described immediately preceding, additionally comprises the step of oxidizing sulfide in the effluent solution from the hydrogen sulfide absorption step, with oxygen to thiosulfate. In such a case, the amount of metal salt and black liquor is sufficient to synergistically catalyze the overall reaction of absorption of hydrogen sulfide and oxidation of sulfide in the solution resulting therefrom.

Preferably, with regard to the method of purifying flue gas and condensates from the kraft pulp mill, the metal salt used is an iron salt. In addition, the concentration of iron, the pH of the solution and the concentration of black liquor is preferably the same as in the composition previously described. Advantageously, the steps of scrubbing with alkaline solution, scrubbing with water to recover heat, and scrubbing the condensates, are performed with countercurrent flow.

DRAWINGS

Embodiments of the invention will now be described with reference to the drawing which is a schematic view of a plant embodying a process of the present invention.

DETAILED DESCRIPTION

It has been found that hydrogen sulfide absorption in an alkaline solution containing a small amount of an iron salt in solution, can be increased by adding black liquor from a typical kraft pulp mill to that solution. In an experiment, equilibrium gas phase concentrations of hydrogen sulfide were measured over alkaline carbonate solutions containing various additives. The experiment was performed at 170° F., with a pH of 9.4, and a sulfide (again including hydrosulfide) concentration measured as sodium sulfide of 0.10 g/liter. The results were as follows:

TABLE I

| Additive | Hydrogen Sulfide Concentration (p.p.m.) |
| --- | --- |
| (i) None | 40 |
| (ii) .002 M. Fe (from an iron salt) | 0 |
| (iii) .002 M. Fe plus 4% weak black liquor | 2 |

As equilibrium is reached fairly rapidly regardless of the additives, the above data is indicative of relative absorption of the various solutions when used to scrub hydrogen sulfide in even a relatively small scrubbing column. As well, the presence of both iron and black liquor together in the solution synergistically increases absorption of hydrogen sulfide by the solution, as the black liquor itself would have little effect on hydrogen sulfide absorption. The particular salt of iron which is used in the solution is of little importance, provided iron ions are produced in the solution, it being understood that when a concentration of iron in solution is referred to throughout this specification, this refers to a concentration of iron ions. Although typically a ferric salt would be used, even ferrous salts would provide similar results since in the presence of an oxygen containing gas, a ferrous-ferric equilibrium will be reached fairly fast.

A concentration of less than 0.002 M. of iron can be used in the above solution, along with a corresponding amount of black liquor as desired. However, the increased absorbtivity of hydrogen sulfide with iron and black liquor together increases with increased concentrations of iron. If the concentration of iron is raised above 0.002 M., with a solution with a pH of about 9.4 it has been found that ferric sulfide will tend to be precipitated when the solution is exposed to a hydrogen sulfide containing gas. Since the solution is typically used to scrub flue gas, in a packed tower so as to absorb hydrogen sulfide from it, precipitation of ferric sulfide would be undesirable since such solid would tend to foul the packing. Although the composition has been described with an iron salt in solution, the iron salt could likely be replaced by chromium, cobalt, or nickel salts.

It has also been found that the rate of oxidation of sulfide in an alkaline solution by excess oxygen substantially at atmospheric pressure, is particularly rapid in the presence of black liquor and is synergistically increased even further in the presence of both iron in solution and black liquor. As an experiment, sulfide oxidation rates in an alkaline carbonate solution were measured at a temperature of 170° F., with a pH of about 9.5, a sulfide concentration [measured as sodium sulfide] of 0.04 g/liter, and using an excess of oxygen at about one atmosphere pressure. The following results were achieved:

TABLE II

| Additive | Oxidation Rate (lbs./hr of Na2S per cubic foot of solution) |
| --- | --- |
| (i) None | less than .01 |
| (ii) .002 M. Fe | .25 |
| (iii) 5% weak black liquor | 1.21 |
| (iv) .002 M. Fe plus %5 weak black liquor | 1.72 |

Thus, the addition of 5% weak black liquor to the alkaline solution is far more effective in increasing oxidation rate than 0.002 M. iron. In addition, as is clear from the above data, the presence of both the iron and the 5% weak black liquor synergistically increases the rate of oxidation of sulfide. When black liquor is used alone in the alkaline solution, various concentrations of it can be used, it being preferred though to retain the concentration at between about 1% to 10% by volume in order to not unduly deplete the supply of the recovered chemicals from the black liquor in a typical kraft pulp mill. In addition, it is further preferred to retain the black liquor concentration at about 5% or less, since it has been found that when concentrations much above 5% are used the rate of increase in oxidation rate with increased concentrations of black liquor begins to decrease. A temperature of the solution of about 100° to 200° F. provides a good reaction rate while not requiring excessive amounts of heat. Although again concentrations of iron of less than 0.002 M. can be used in the solution containing both iron and black liquor, the oxidation rate increases with increased concentrations of iron and corresponding amounts of black liquor. Although the synergistic effect of iron and black liquor has been described to increase oxidation rate in the above solution, salts of chromium, cobalt and nickel could also likely be substituted for the iron salt.

As the composition of the solution in example (iv) in Table II above is basically the same as that of (iii) in Table I, it will be evident that the same solution can be used in a method for scrubbing flue gas to absorb hydrogen sulfide from it, the effluent solution from the scrubbing step then being exposed to oxygen at about atmospheric pressure (typically by bubbling through the solution) to oxidize sulfide primarily to thiosulfate. Because of this, it is undesirable to have a concentration of iron in solution of greater than about 0.002 M. since again, such would produce ferric sulfide precipitate in the absorption step which could foul a packed column. As well, although the pH of the solution can be varied somewhat, it is preferred that the pH be between about 9.0 to 9.5 since such a range provides maximum absorption of hydrogen sulfide while at the same time minimizing absorption of carbon dioxide from the flue gas which absorption would result in undesirable formation of carbonates and consumption of hydroxide. As the iron and black liquor do not appear to be consumed in the overall absorption and oxidation reaction, it can be said that the combination of the two synergistically catalyzes the overall reaction of absorption followed by oxidation.

Flue gas which has previously been scrubbed with alklaine solution, can be used to scrub condensates to remove methanol therefrom. In an experiment, a packed tower was used for such methanol stripping. Condensates containing approximately 6,000 p.p.m. of methanol were fed into the top of the tower, and water saturated air was fed into the bottom countercurrent with the methanol flow, the air being at a temperature of about 140° F. The liquid flow to dry gas ratio was about 1.5 and residence time in the tower was excessive such that increasing residence time would not have affected results. It was determined that methanol removal from the condensates was about 85%. Water vapour saturated flue gas would also produce a similar result. However, the efficiency of methanol removal decreases with decreasing temperature and humidity of the gas used.

To summarize then, an overall process for purifying flue gas and condensates from a kraft mill, which utilizes the above results, could consist of the following steps:
1. First cooling the flue gas to near its dew point;
2. Scrubbing the cooled flue gas from step 1 with water to remove particulates;
3. Scrubbing the effluent gas from step 2 with an alkaline solution to absorb hydrogen sulfide;
4. Scrubbing the condensates with effluent gas from step 3 to remove methanol from the condensates; and
5. Oxidizing sulfide in the effluent solution from step 3 with oxygen to thiosulfate.

Typically, the entire five step process can be performed in the manner as shown in the FIGURE. A four stage gas scrubber as descrbed in pending U.S. patent application filed on the same date as this application by Hauptman and entitled Apparatus for Treating Flue Gas and Methanol Containing Effluents, is preferably used as the gas scrubber 2. For a typical 1,000 ton per day kraft mill, the gas scrubber 2 would have a height of 20 feet, the outer diameter of chamber 4 being about 70 feet, chamber 6, 60 feet, chamber 8, 44 feet, and chamber 10, 35 feet. The flue gas to be purified is first cooled in gas cooler 12 from its initial temperature of about 250° F. to about 170° F., the latter temperature being near the dew point of the gas. Such cooling enhances subsequent particulate removal by enhancing condensation mechanisms, and the heated cooling water can of course, be recirculated to the mill. The flue gas as it leaves the gas cooler will typically contain about 300 p.p.m. of hydrogen sulfide and will be fed tangentially into chamber 4 through line 14 at a rate of about 250,000 SCFM. In chamber 4, the gas is scrubbed by water entering through line 16 and spray nozzles (not shown) positioned on the inner wall of chamber 4 to spray in a direction toward its outer wall. Such scrubbing removes most particulates down to about 0.5 microns in size. The effluent water from chamber 4 passes through line 18 into ballast tank 20 where it is then cooled to enhance collection in chamber 4 prior to being pumped back into chamber 4 through line 24 and 16. Density meter 22 measures the density of the solution in ballast tank 20, and controls an overflow through line 26 to return chemicals to the mill recovery cycle, and also controls fresh water input through line 28. The effluent gas from chamber 4 passes into the lower portion of chamber 6 which is packed with about 12 feet in height of 2 inch plastic pall rings. The gas in chamber 6 is scrubbed countercurrently with an alkaline solution of 0.002 M. Fe and containing about 4% to 5% black liquor, which solution enters through line 30 at the top of chamber 6. The net effect of scrubbing in chamber 6 is removal of the majority of hydrogen sulfide gas, as well as removal of much of the sulphur dioxide. The prior removal of particulates in chamber 4 minimizes possible fouling of the packing in chamber 6.

The effluent solution from chamber 6 flows through line 34 into oxidizing tank 38. The oxidizing tank would have a diameter of about 30 feet and a height of about 20 feet. Air is pumped through line 40 at a pressure sufficiently greater than atmospheric pressure as will overcome the depth of a solution in tank 38, the rate of such input being 7,000 ACFM (that is "Actual Cubic Feet per Minute"). The oxygen in the air in the presence of the iron and black liquor will oxidize the sulfide in solution primarily to thiosulfate as previously described. In addition, sulphur dioxide absorbed in the effluent solution from chamber 6 will be oxidized primarily to sulfate. The height of liquid in oxidizing tank 38 is maintained at about 9 feet to 10 feet by means of an overflow which feeds into line 46. Line 46 also bleeds off a small amount of the flow through line 34. Liquid passing through line 46 is passed into evaporators for recovery of the chemicals contained in it, thiosulfate being particularly useful in the photographic industry. The density indicator 48 connected to oxidizing tank 38, controls a makeup flow of black liquor and iron catalyst through line 36, and also controls fresh water input through line 50 to oxidizing tank 38.

The solution then passes from oxidizing tank 38 through line 44 and into the foam and stilling tank 52. Here any foam generated in oxidizing tank 38 has time to settle. Some of the liquid in tank 52 is returned by line 42 to oxidizing tank 38 to ensure complete oxidization. The foam and stilling tank 52 is about 20 feet in diameter and 30 feet in height. Air outlet 54 permits spent air from the oxidizing reaction to pass out to the atmosphere. The rate of air flow through line 54 would be about 11,000 ACFM.

Most of the solution from tank 52 is pumped through line 55 at a rate at about 24,000 USGPM and back into line 30 for further hydrogen sulfide removal in chamber 6. pH meter 56 controls the alkalinity of the solution going into line 30 and maintains it in a range of about 9.0 to 9.5 by adding sodium hydroxide from storage tank 58, through line 60, usually at a rate of about 35 USGPM.

The flue gas leaves chambers 6 at a temperature of about 155° F. and enters the top of chamber 8. In chamber 8, the gas is scrubbed concurrently with cold water from line 62 at a rate of above 2,000 USGPM in order to recover heat from the gas. Such scrubbing will lower the flue gas temperature to about 140° F. Warm water leaves chamber 8 through line 64 at a temperature of about 145° F. and a rate of about 2,000 USGPM. Effluent gas from chamber 8 then flows into the bottom of chamber 10, which is packed to about 12 feet in height with 2 inch plastic pall rings. Condensate from the mill is fed through line 66 into chamber 10 at a rate of about 800 USGPM. Typically, the condensate will contain about 2,000 PPM of methanol. The condensate is scrubbed concurrently in chamber 10 by the effluent gas from chamber 8. The cleaned condensate will leave the bottom of chamber 10 through line 68, at a temperature of 140° F. and containing only about 200 PPM of methanol. The effluent gas from chamber 10 is discharged to the atmosphere through line 70 at a rate of about 2,040 SCFM. The effluent gas in chamber 10 passing through line 70 will typically be at a temperature of about 140° F., saturated with water vapour, and contain about 4 PPM of hydrogen sulfide.

The manner of making each of the solutions described above, will of course be obvious. The alkaline solution used for scrubbing in chamber 6 is typically a carbonate solution, although any other basic solution such as sodium hydroxide solution can be used. Although metal salts are referred to for the source of metal ions in solution, any metal compound can be utilized which will produce the required concentration of metal ions in solution. The particular temperatures and feed rates of the various steps can of course, be adjusted to suit the particular mill. In addition, portions of the process, for example, the hydrogen sulfide absorption step or the sulfide oxidation step, could be employed independently if desired. As well, concentrations of various chemicals in solutions, and the pH of such solutions can be altered somewhat, bearing in mind the previous discussion regarding such alterations.

As will be apparent to those skilled in the art in light of the foregoing disclosure, many alterations and modifications are possible in the practice of this invention without departing from the spirit or scope thereof. Accordingly, the scope of this invention is to be construed in accordance with the substance defined by the following claims.

I claim:

1. A composition comprising an aqueous alkaline solution of a metal salt and black liquor, the metal salt being selected from the group consisting of iron, chromium, cobalt, and nickel salts, with the concentration of black liquor being 1 to 10% by volume, and the amount of metal salt and black liquor in solution being sufficient to synergistically increase absorption of hydrogen sulfide by said solution.

2. A composition comprising an aqueous alkaline solution of a metal salt and black liquor, the metal salt being selected from the group consisting of iron, chromium, cobalt, and nickel salts, with the concentration of black liquor being 1 to 10% by volume, and the amount of metal salt and black liquor in solution being sufficient to synergistically catalyze the overall reaction of absorption of hydrogen sulfide by said solution, followed by oxidation of sulfide therein by oxygen to thiosulfate.

3. A composition as described in claim 2 wherein the metal salt is a salt of iron.

4. A composition as described in claim 3 wherein the concentration of iron in solution is substantially 0.002 M.

5. A composition as described in claim 2, 3, or 4 wherein the pH is between about 9.0 to 9.5.

6. A composition as described in claim 2, 3 or 4 wherein the pH is about 9.0 to 9.5 and the black liquor concentration is between about 1% to 5% by volume.

7. A method of purifying flue gas comprising scrubbing the flue gas with an aqueous alkaline solution of a metal salt and black liquor to absorb hydrogen sulfide, the metal salt being selected from the group consisting of iron, chromium, cobalt, and nickel salts, with the concentration of black liquor being 1 to 10% by volume, and the amount of metal salt and black liquor in solution being sufficient to synergistically increase absorption of hydrogen sulfide by the solution.

8. A method as described in claim 7 wherein the metal salt is a salt of iron.

9. A method as described in claim 8 wherein the pH of the alkaline solution is about 9.0 to 9.5, the concentration of iron therein is substantially 0.002 M. and wherein the concentration of black liquor in the solution is about 1% to 5% by volume.

10. A method of oxidizing sulfide in an alkaline solution comprising exposing the solution to oxygen in the presence of black liquor dissolved in the solution, the black liquor concentration being 1 to 10% by volume.

11. A method as described in claim 10 wherein the temperature is between 100°–200° F.

12. A method as described in claim 10 wherein the alkaline solution is exposed to oxygen in the presence of black liquor and a metal salt selected from the group consisting of iron, chromium, cobalt, and nickel salts, the black liquor and metal salt both being dissolved in the solution with the concentration of black liquor being 1 to 10% by volume, and the amount of both being sufficient to synergistically increase the rate of oxidation of sulfide.

13. A method as described in claim 12 wherein the metal salt is a salt of iron.

14. A method as described in claim 10, 12 or 13, wherein the pH of the alkaline solution is about 9.0–9.5, the concentration of iron therein is substantially 0.002 M., and wherein the concentration of black liquor in the solution is about 1% to 5% by volume.

15. A method of purifying flue gas comprising:

(a) first scrubbing the flue gas with an aqueous alkaline solution of a metal salt and black liquor to absorb hydrogen sulfide, the metal salt being selected from the group consisting of iron, chromium, cobalt and nickel salts;

(b) oxidizing sulfide in the effluent solution from step (a), by oxygen to thiosulfate; the concentration of black liquor being 1 to 10% by volume, and the amount of metal salt and black liquor being sufficient to synergistically catalyze the overall reaction of absorption of hydrogen sulfide in step (a), and step (b).

16. A method as described in claim 15 wherein the metal salt is a salt of iron.

17. A method as described in claim 16 wherein the concentration of iron is substantially 0.002 M.

18. A method as described in claim 15, 16 or 17 wherein the pH of said aqueous alkaline solution is about 9.0 to 9.5.

19. A method as described in claim 15, 16 or 17 wherein the pH of said aqueous alkaline solution is about 9.0 to 9.5 and the black liquor concentration is about 1% to 5% by volume.

20. A method as described in claim 15, 16 or 17 wherein the flue gas is scrubbed countercurrently with the aqueous alkaline solution.

21. A method of purifying flue gas and condensates from a kraft pulp mill, comprising:
(a) scrubbing the flue gas with an aqueous alkaline solution of a metal salt and black liquor to absorb hydrogen sulfide, the metal salt being selected from the group consisting of iron, chromium, cobalt, and nickel salts, with the concentration of black liquor being 1 to 10% by volume, and the amount of metal salt and black liquor in solution being sufficient to synergistically increase absorption of hydrogen sulfide by the alkaline solution;
(b) recovering heat from the flue gas by scrubbing with water;
(c) then scrubbing the condensates with the flue gas to remove methanol from the condensates.

22. A method as described in claim 21 wherein the scrubbing of step (b) is maintained until the temperature of the gas is between 130°–160° F.

23. A method of purifying flue gas and condensates from a kraft pulp mill, comprising:
(a) first cooling the flue gas to near its dew point;
(b) scrubbing the cooled flue gas from step (a) with water, to remove particulates;
(c) scrubbing the effluent gas from step (b) with an aqueous alkaline solution of a metal salt and black liquor to absorb hydrogen sulfide, the metal salt being selected from the group consisting of iron, chromium, cobalt, and nickel salts, with the concentration of black liquor being 1 to 10% by volume, and the amount of metal salt and black liquor in solution being sufficient to synergistically increase absorption of hydrogen sulfide by the alkaline solution;
(d) scrubbing the condensates with effluent gas from step (c) to remove methanol from the condensates.

24. A method of purifying flue gas and condensates from a kraft pulp mill comprising:
(a) first scrubbing the flue gas with water to remove particulates;
(b) scrubbing the effluent gases from step (a) with an aqueous alkaline solution of a metal salt and black liquor to absorb hydrogen sulfide the metal salt being selected from the group consisting of iron, chromium, cobalt, and nickel salts, with the concentration of black liquor being 1 to 10% by volume, and the amount of metal salt and black liquor in solution being sufficient to synergistically increase absorption of hydrogen sulfide by the alkaline solution;
(c) scrubbing the effluent gas from step (b) with water, to recover heat;
(d) scrubbing the condensates with the effluent gas from step (c).

25. A method as described in claim 24 wherein the scrubbing of step (c) is maintained until the temperature of the gas is between 130°–160° F.

26. A method as described in claim 24 additionally comprising oxidizing the sulfide in the effluent solution from step (b) with oxygen to thiosulfate, and wherein the amount of metal salt and black liquor is sufficient to synergistically catalyze the overall reaction of absorption of hydrogen sulfide in step (b) and oxidation thereof.

27. A method as described in claim 23, 24 or 26 wherein the metal salt is an iron salt.

28. A method as described in claim 23, 24 or 26 wherein the metal salt is an iron salt, and the concentration of iron in the alkaline solution is substantially 0.002 M.

29. A method as described in claim 23, 24 or 26 wherein the metal salt is an iron salt and wherein the concentration of iron in the alkaline solution is substantially 0.002 M. and the pH thereof is between about 9.0 to 9.5.

30. A method as described in claim 23, 24 or 26 wherein the metal salt is an iron salt, the concentration of iron in the alkaline solution is substantially 0.002 M., and wherein the pH of the alkaline solution is about 9.0 to 9.5 and the black liquor concentration therein is about 1% to 5% by volume.

31. A method as described in claim 23, 24 or 26 wherein the scrubbing in steps (c) and (d) is countercurrent.

* * * * *